Figure 1:
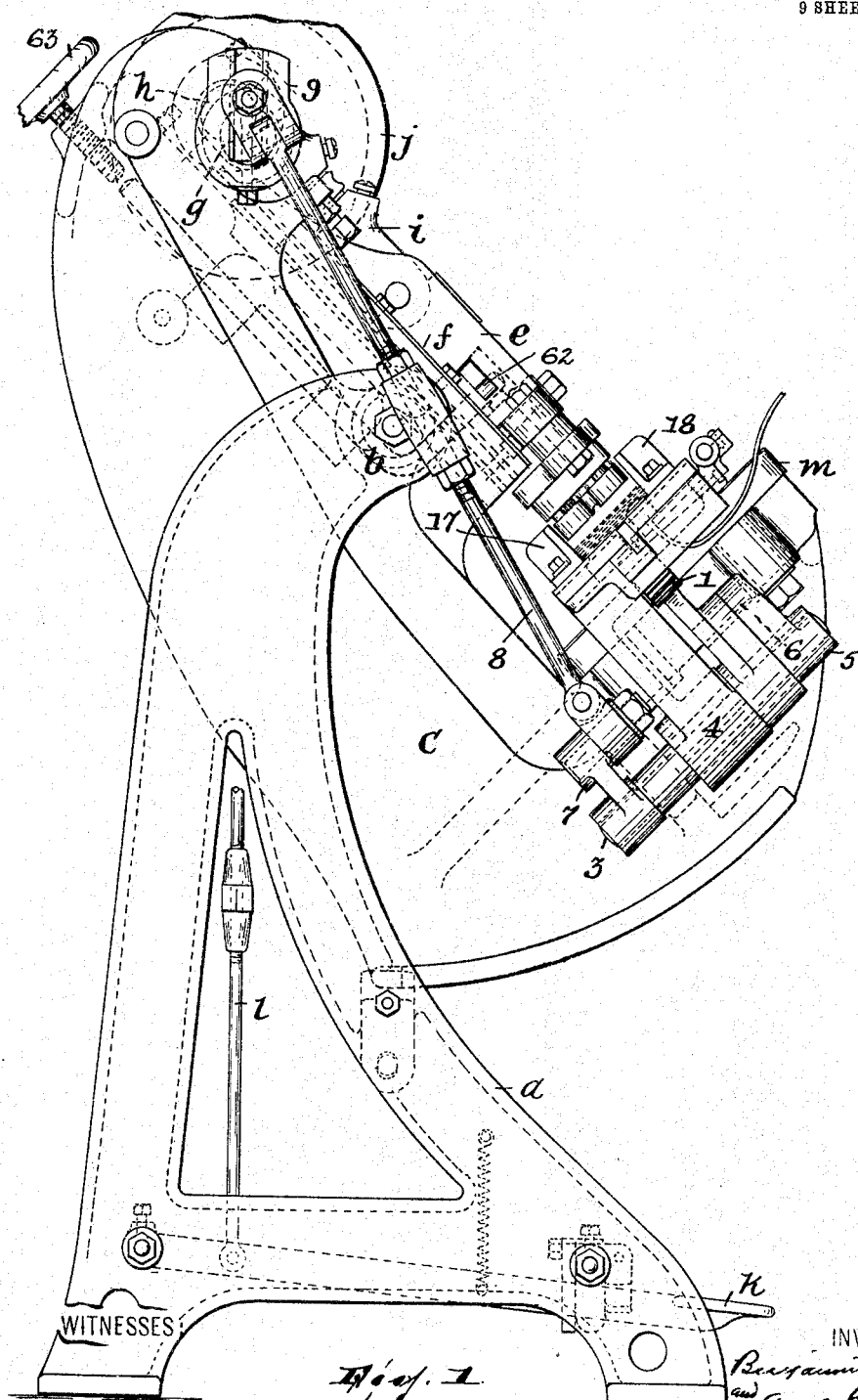

B. ADRIANCE & A. CALLESON.
MACHINE FOR MAKING ARTICLES OF SHEET METAL.
APPLICATION FILED JULY 22, 1907.

947,273.

Patented Jan. 25, 1910.
9 SHEETS—SHEET 1.

WITNESSES

INVENTORS
Benjamin Adriance
and Amos Calleson,
BY
Gartner Seward,
ATTORNEYS.

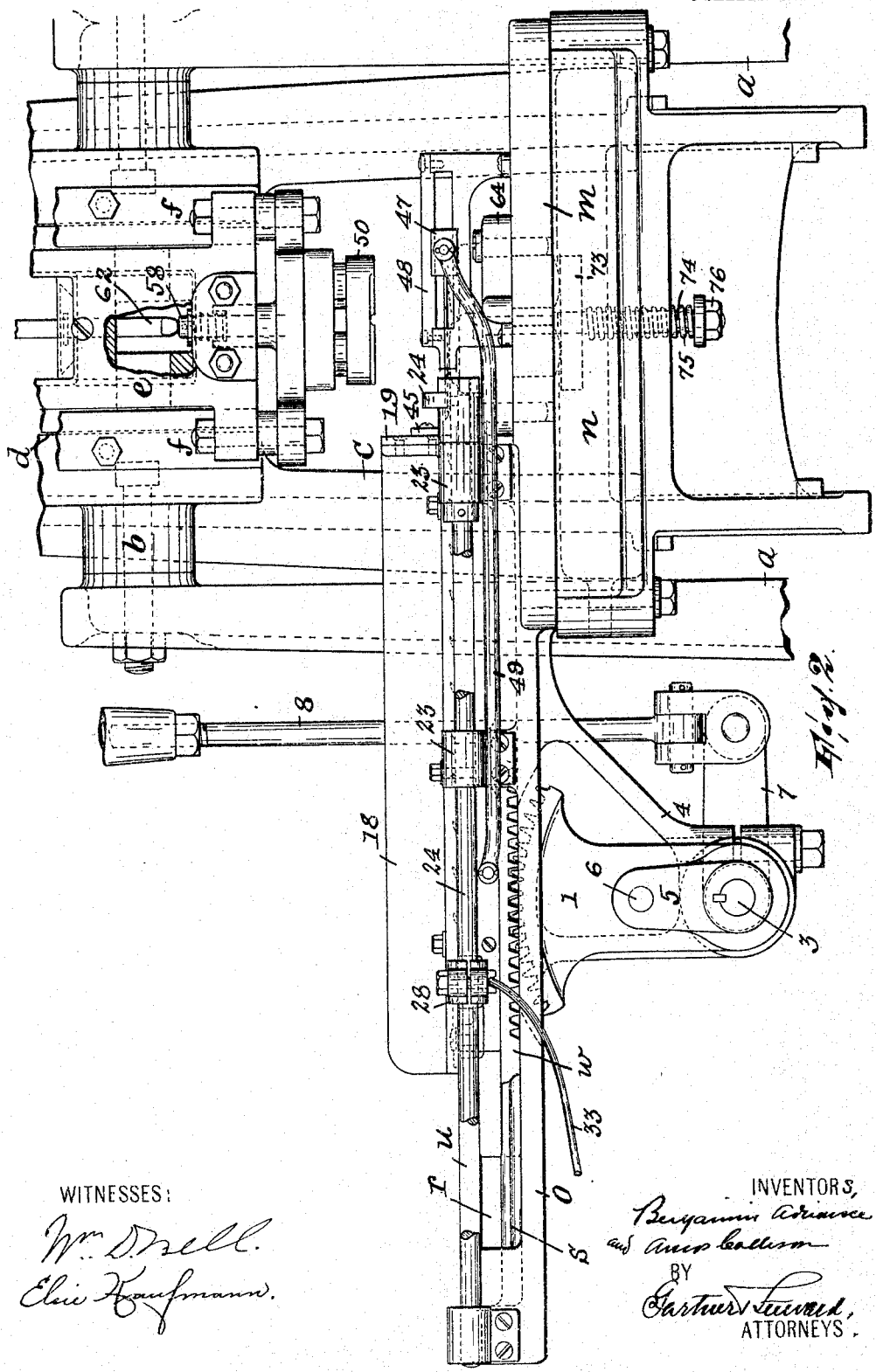

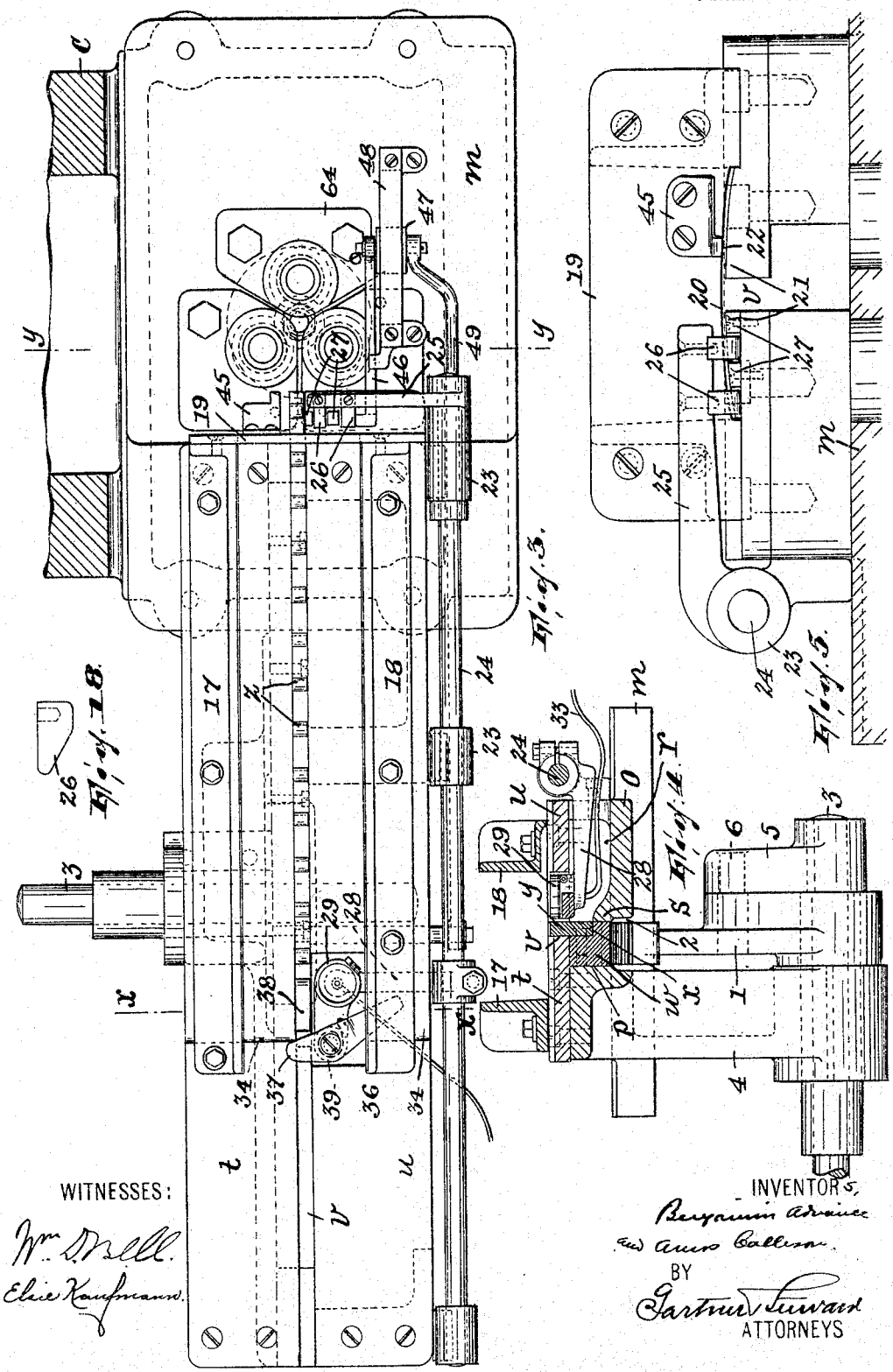

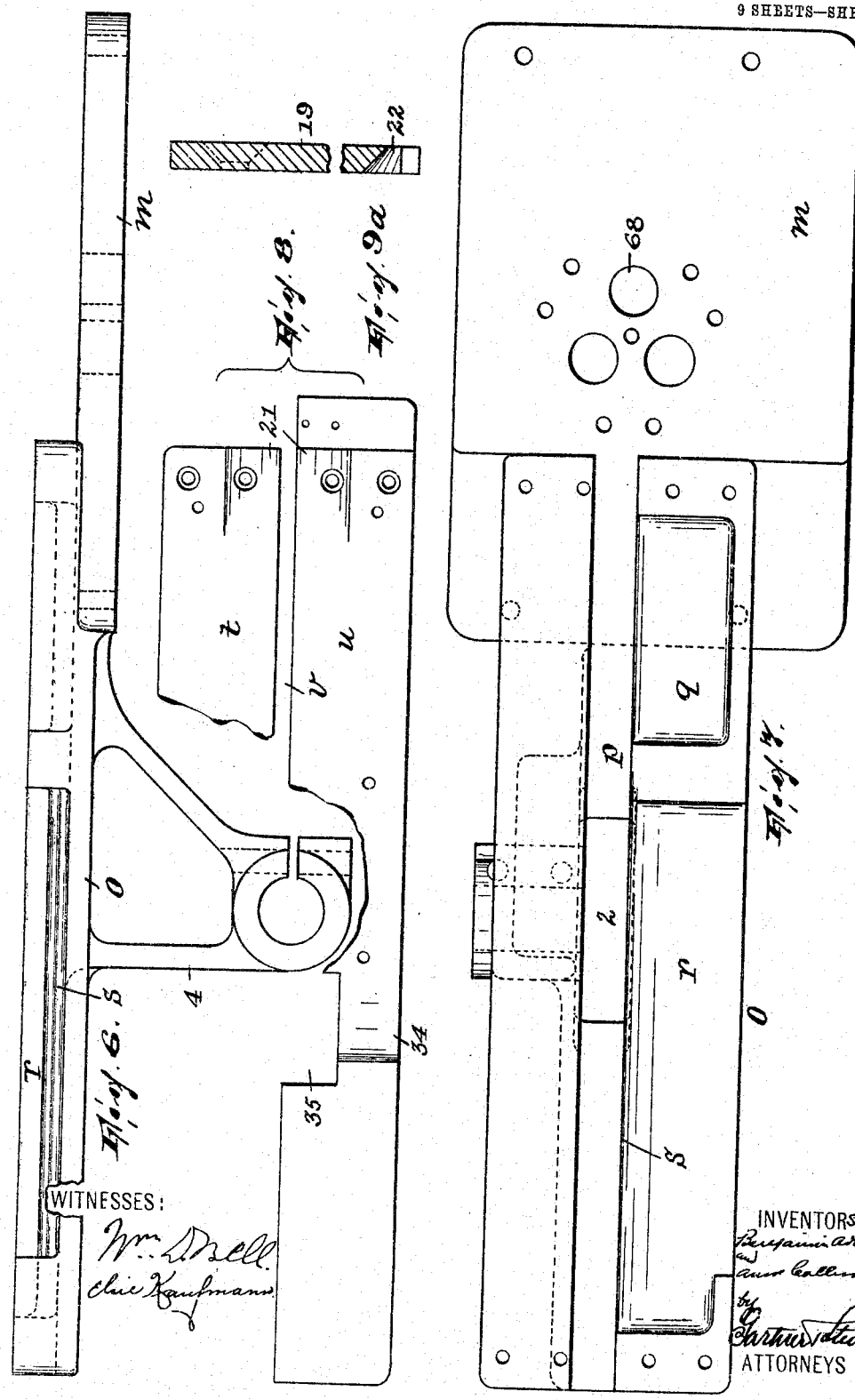

B. ADRIANCE & A. CALLESON.
MACHINE FOR MAKING ARTICLES OF SHEET METAL.
APPLICATION FILED JULY 22, 1907.
947,273.
Patented Jan. 25, 1910.
9 SHEETS—SHEET 5.
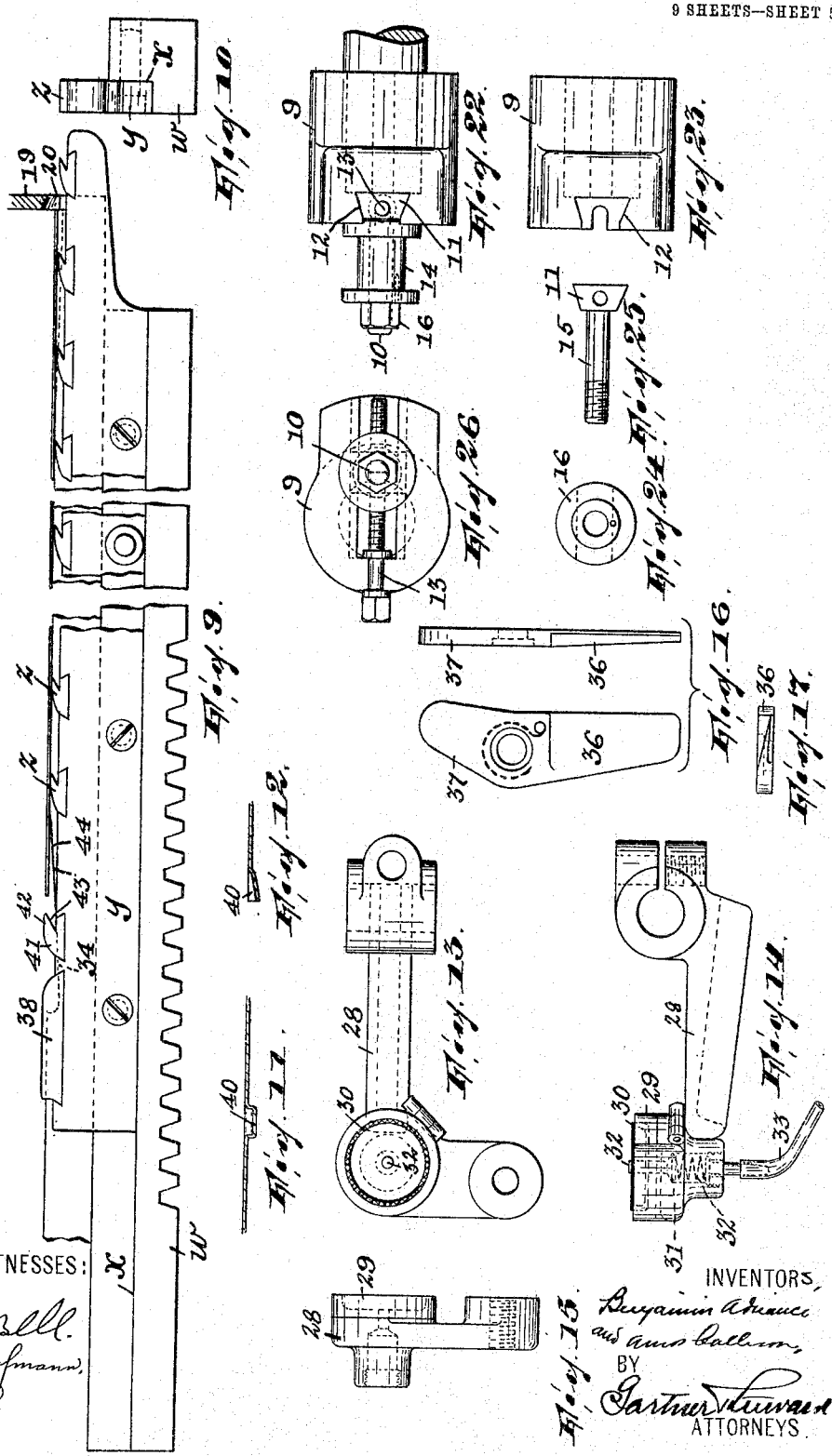

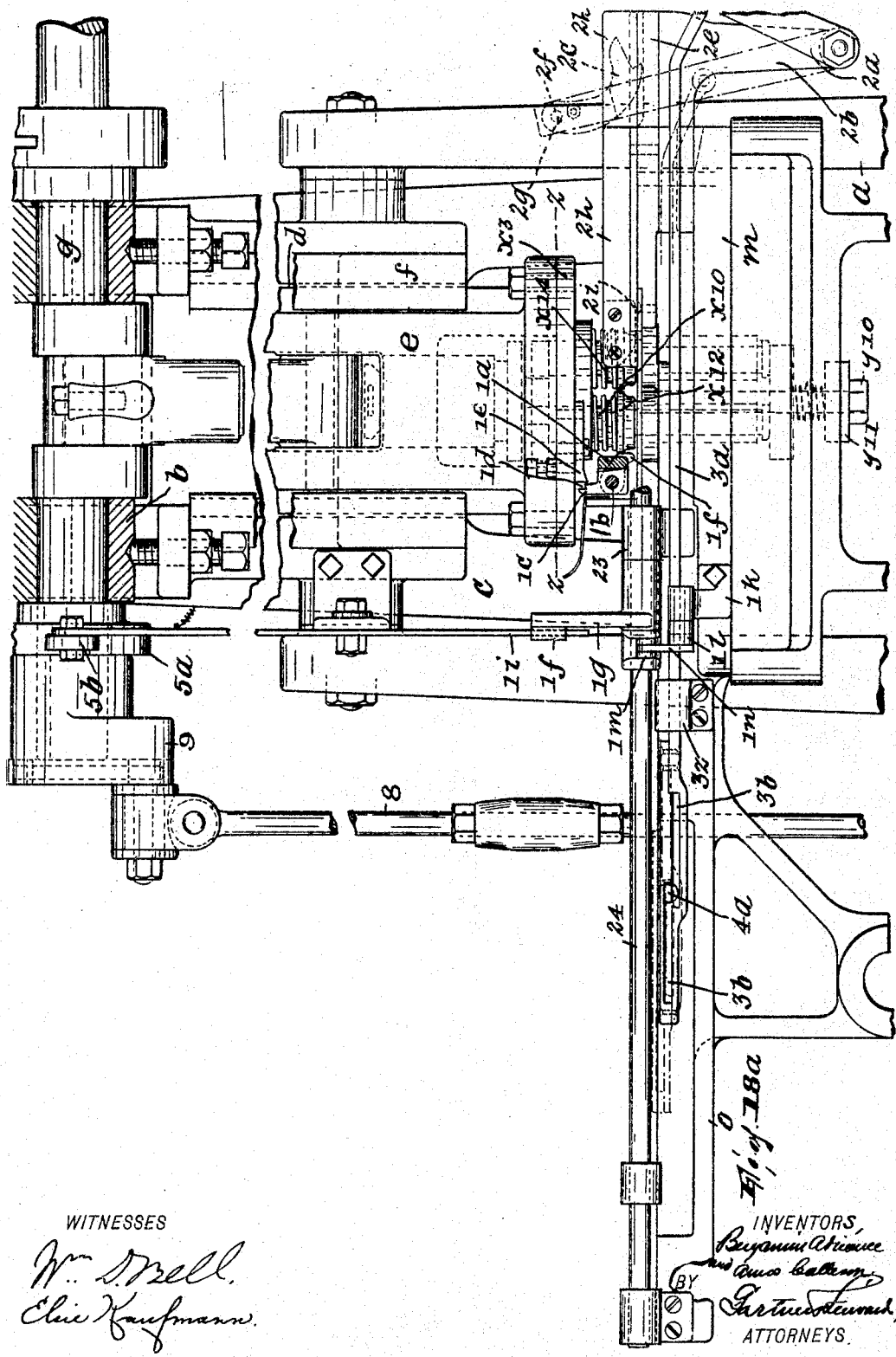

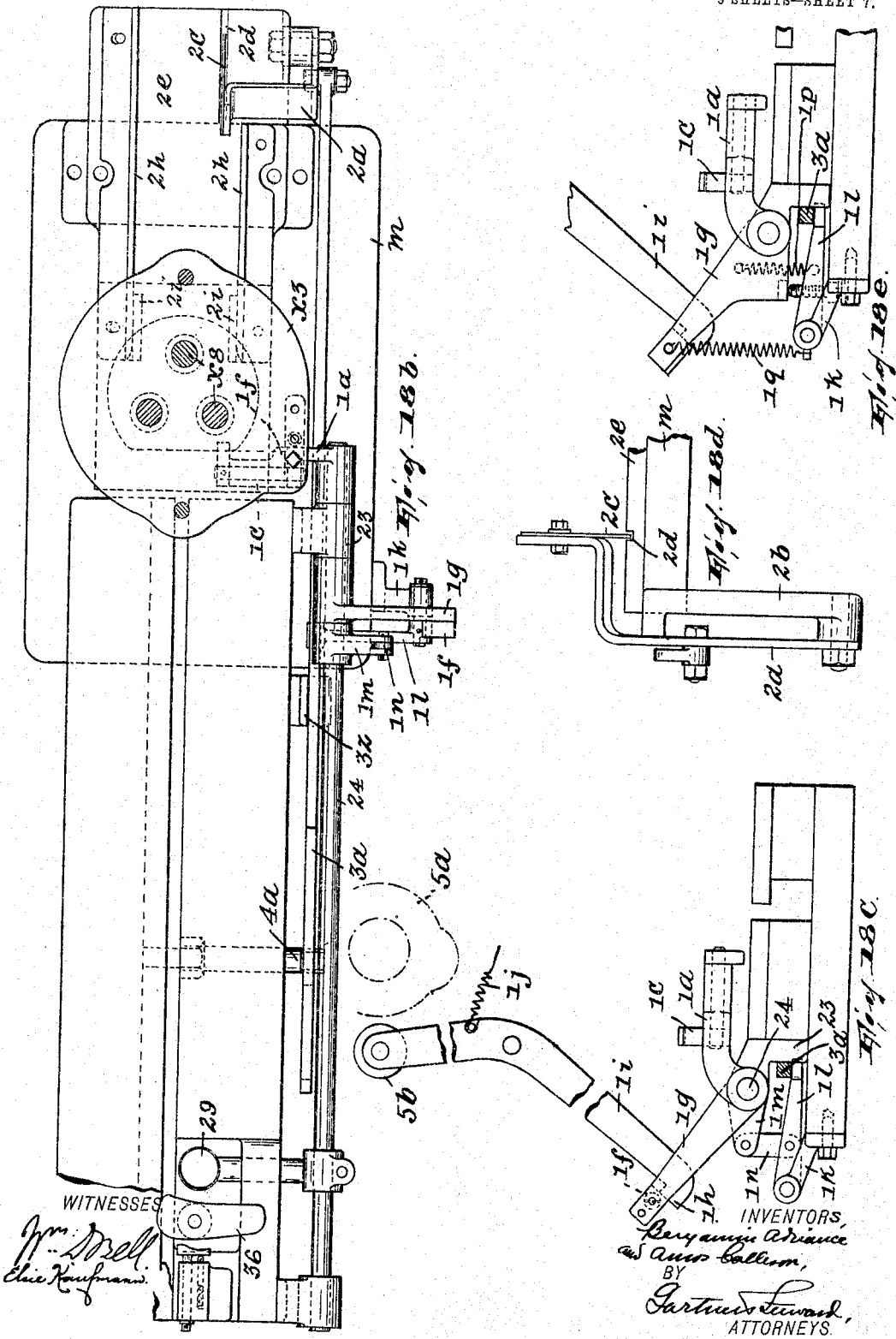

B. ADRIANCE & A. CALLESON.
MACHINE FOR MAKING ARTICLES OF SHEET METAL.
APPLICATION FILED JULY 22, 1907.
947,273.
Patented Jan. 25, 1910.
9 SHEETS—SHEET 8.
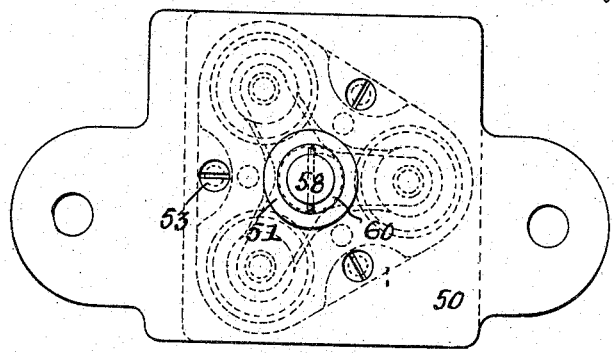
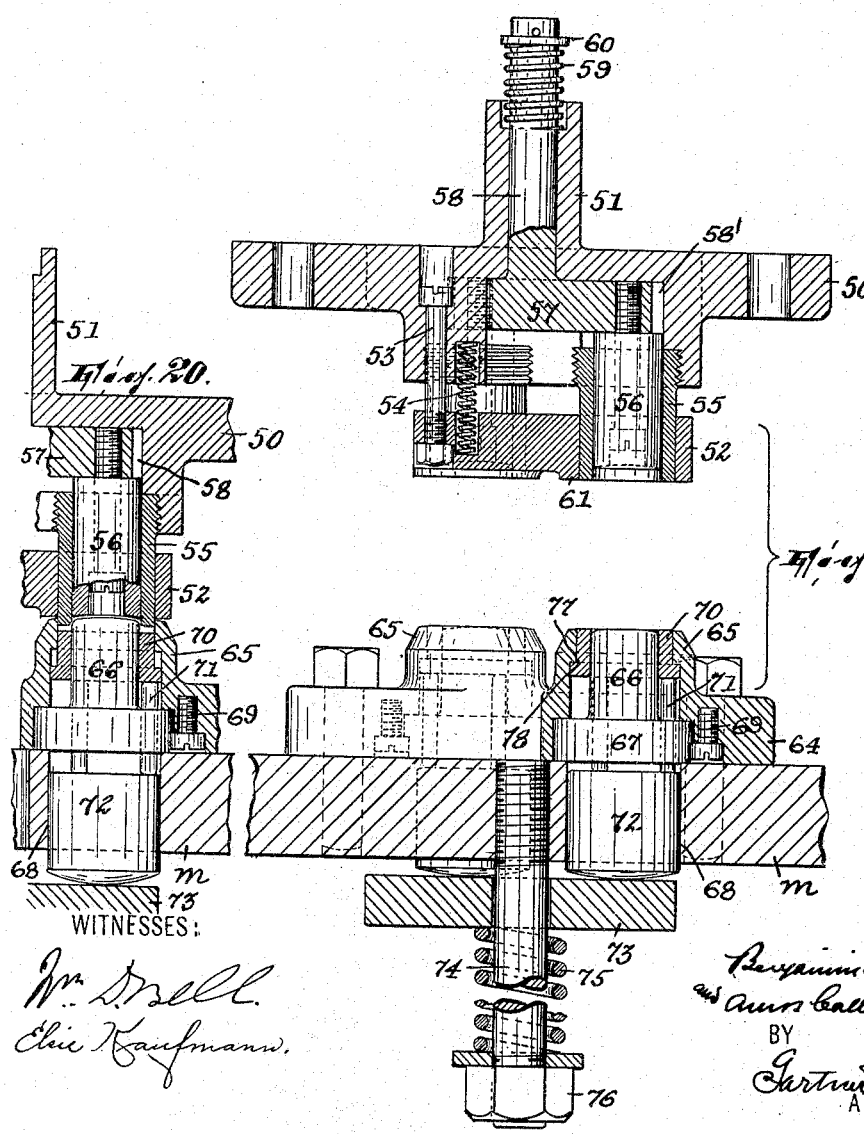

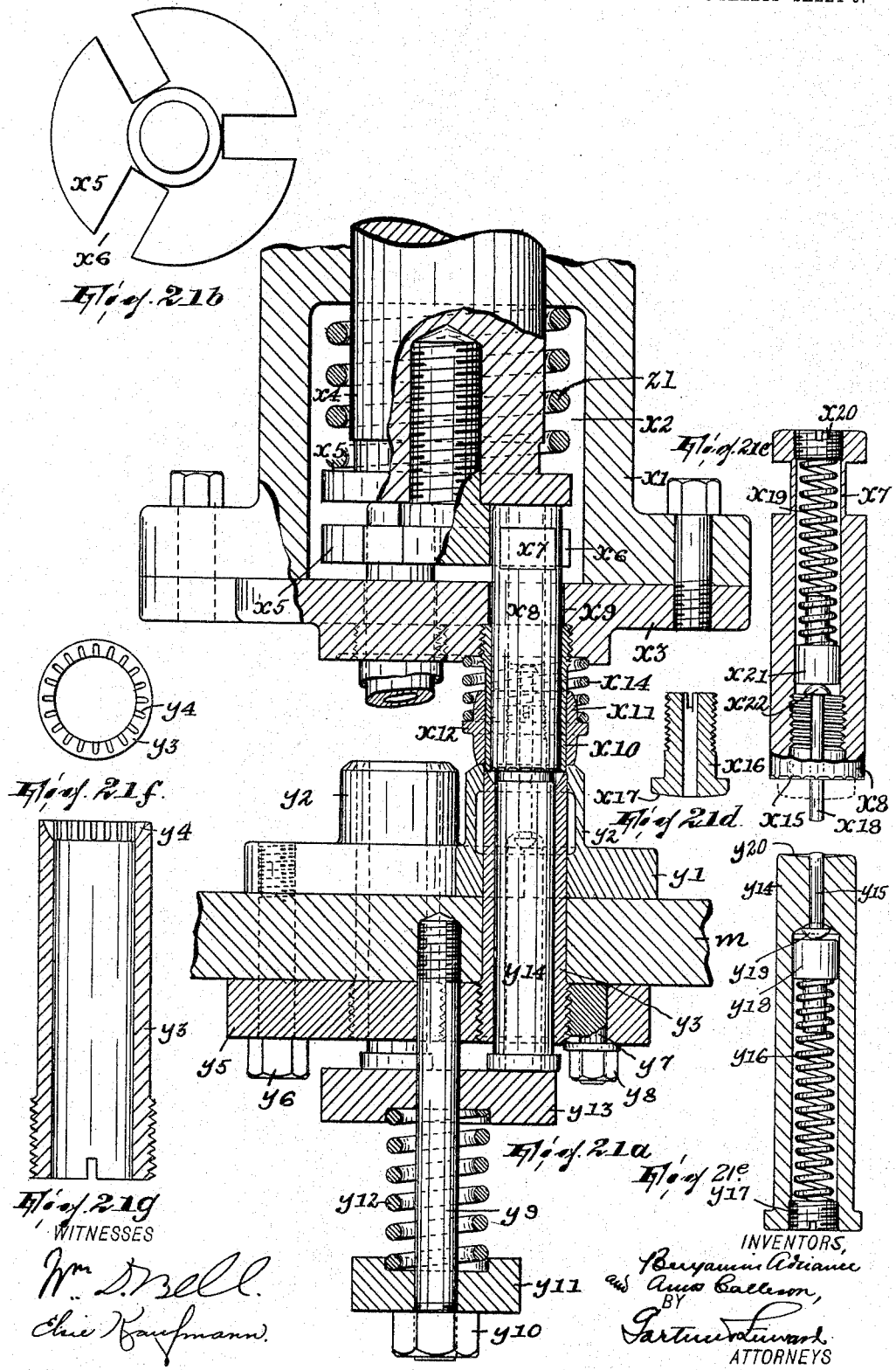

UNITED STATES PATENT OFFICE.

BENJAMIN ADRIANCE AND AMOS CALLESON, OF BROOKLYN, NEW YORK; SAID CALLESON ASSIGNOR TO SAID ADRIANCE.

MACHINE FOR MAKING ARTICLES OF SHEET METAL.

947,273.      Specification of Letters Patent.     Patented Jan. 25, 1910.

Application filed July 22, 1907. Serial No. 384,965.

*To all whom it may concern:*

Be it known that we, BENJAMIN ADRIANCE and AMOS CALLESON, citizens of the United States, residing in Brooklyn, county of Kings, State of New York, have invented certain new and useful Improvements in Machines for Making Articles of Sheet Metal; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates to machines for punching out and shaping sheet metal articles such, for instance, as bottle caps and the like.

The principal object of the invention is to provide a machine of this nature which shall be capable of turning out its product in very large quantities during a given period, operating precisely and positively and without producing more than the very minimum waste of material.

To this end the invention consists, firstly, in a novel punching and shaping means; secondly, in a novel means for advancing the sheets step-by-step to their proper position relatively to the punching mechanism; thirdly, in a novel means for successively parting the sheets from the group of sheets preparatory to their step-by-step advance; fourthly, in a novel means whereby the undesired advance of sheets which may adhere to those intended to be advanced is prevented; and, fifthly, in a means whereby each sheet is first so formed or shaped as to insure the action thereon of the advancing means.

Referring to the accompanying drawings, in which the invention is fully illustrated, Figure 1 is a side view of the machine; Fig. 2 is a view in front elevation of the main part of the machine; Fig. 3 is a sectional view taken in a plane parallel with the table and just below the punch; Fig. 4 is a cross-sectional view on line $x$—$x$ of Fig. 3, looking toward the left; Fig. 5 is a cross-sectional view on line $y$—$y$ of Fig. 3, looking toward the right, certain parts being omitted; Fig. 6 is a front view of the table detached, and Fig. 7 a plan view thereof; Fig. 8 is a plan view of certain parts which rest on the table; Fig. 9 is a front view of the sheet advancing mechanism, the same showing also a part of the sheet shaping mechanism; Fig. 9$^a$ is a sectional view of a certain plate 19; Fig. 10 is an end view of certain parts seen in Fig. 9; Figs. 11 and 12 show the shaped portion of a sheet in cross sections at right angles to each other; Figs. 13, 14 and 15 are top plan, side and end views of certain parts of the sheet detaching or separating mechanism; Figs. 16 and 17 show in different positions another part of said sheet detaching or separating mechanism; Fig. 18 is a view of still another part of said mechanism; Figs. 18$^a$ to 18$^e$ are views illustrating another form of the sheet advancing, shaping and separating mechanism; Fig. 18$^a$ being a front view of the machine with said mechanism attached; Fig. 18$^b$ a horizontal sectional view on the line $z$—$z$ of Fig. 18$^a$; Fig. 18$^c$ a view of a part of said mechanism looking toward the left in Fig. 18$^a$; and, Figs. 18$^d$ and 18$^e$ views of two different forms of another part of said mechanism also looking toward the left in Fig. 18$^a$; Fig. 19 is a vertical sectional view of the principal parts of the punching mechanism, the upper member thereof being shown in its upper or retracted position; Fig. 20 is a fragmentary sectional view substantially like Fig. 19 except that it shows the members of the punch brought together; Fig. 21 is a plan view of the upper member of the punching mechanism detached; Figs. 21$^a$ to 21$^g$ are views of another form of the punching mechanism; Fig. 21$^a$ showing some of the parts in vertical section and others in elevation in the position for shaping the caps after they have been punched from the sheet; Figs. 21$^b$, 21$^c$ and 21$^d$ showing details of the upper portion of said mechanism and Figs. 21$^e$, 21$^f$ and 21$^g$ showing details of the lower portion of said mechanism; and, Figs. 22, 23, 24, 25 and 26 are details illustrating a certain crank.

In the accompanying drawings, $a$ designates two suitably braced uprights in which is fulcrumed at $b$ a frame $c$ which, as usual in machines of this character, normally stands in an inclined position, as shown in Fig. 1, suitable means being provided for securing it adjustably at any desired inclination. The frame $c$ affords at $d$ a slide-way for the plunger $e$ which carries the upper member of the punching mechanism, $f$ being strips secured to the frame at the front of the slide-way and over-lapping the plunger, as best seen in Fig. 2. It is unnecessary to describe herein the manner in which the plunger is reciprocated more particularly than to state that the frame c affords bearings in its upper portion for a shaft g having a crank h to which the plunger is connected through the medium of an adjustable pitman i, it being remarked that such mechanism is well known in the art and that the invention in no wise appertains to the same. As is also common in these machines, a suitable driving means, comprising, say, a pulley (not shown) loosely arranged on shaft g and a clutch j controlled from a treadle k through the medium of a pitman l, is provided.

m is a table which is bolted to the table-supporting portion n of the frame c, the body of said table being disposed under the punching mechanism; o is the extension portion of such table, the same having its top surface somewhat higher than the top surface of the body portion m of the table and being formed with a longitudinal groove p and, forward of said groove, with cavities q and r, the latter extending from the front of the extension back to the groove, where its bottom surface rises slightly to form a shoulder s (Fig. 4).

t and u are plates attached to the top of the extension o in slightly spaced relation whereby to form a slot v somewhat narrower than the groove p, the forward side of such slot being flush with the corresponding side of the groove.

In the groove p, and fitting snugly between the back surface thereof and shoulder s runs a rack w, the same having a rabbet x which receives a plate y provided with teeth z which project slightly above the top surfaces of the plates t and u. The teeth are adapted to advance each sheet in a step-by-step movement, so they are equidistantly arranged a distance apart from each other which corresponds to the distance which the sheet must move each time in order to bring the sheet into its new position after each punching operation.

The rack w is reciprocated by means of a segment 1 which projects through an opening 2 in the bottom of the groove p and which is mounted on a rock shaft 3 journaled in a bracket 4 depending from the extension o, said rock-shaft carrying at one end a crank 5 having a pin 6 which connects it with the segment and at the other end a crank 7 which is connected by a flexible pitman 8 with a crank 9. In order to secure adjustment of the throw of the rack w, we provide for adjustment as between cranks 7 and 9. Crank 9 is therefore constructed so as to permit this adjustment as best shown in Figs. 22 to 26 where the crank pin 10 has a dove-tailed portion 11 arranged in the dove-tailed groove 12 in the crank 9, an adjusting screw 13 being swiveled in the crank and having its threaded portion passing through and tapped into the crank pin. The crank pin may comprise a flanged bushing 14 held in place on the crank pin proper 15 by a nut 16.

On the plates t and u are secured the parallel guides 17 and 18, the same being spaced to correspond to the width of the sheets to be punched which, it may be remarked, are arranged in a pile between said guides. At about the junction between the body portion and extension o of the table, and attached to the guides 17 and 18, is a wall 19 having an opening 20 in its lower portion the highest point of which (to wit, over the rack w), is just sufficiently high so that only the bottom sheet in the pile resting on the teeth z, may pass through the opening.

Referring to Fig. 8 it will be noticed that the plates t and u are formed with a convex rise 21 (see also Fig. 5); and, it being remarked that the opening 20 is shaped to conform with this rise, a curved slit 22, beveled on the side adjoining the rack (see Fig. 9ª), is produced between the rise and the wall 19 through which the sheet being operated upon passes, the purpose of said slit being to curve the sheet, particularly at its leading end, as it is forced against the bevel of the slit.

In the bearings 23 attached to the front of the table is journaled a rock shaft 24 which carries at the end thereof adjoining the punching mechanism an arm 25 arranged relatively beyond the wall 19 and having two fingers 26 which, in side elevation, (Fig. 18) are beveled off on the under sides thereof in such manner that as a sheet is advanced through the slit 22 it will slip under said fingers and, raising the same and the arm, rock the shaft 24 in its bearings. The fingers 26 are arranged to alternate with spaced studs 27 arranged on the body portion of the table close to wall 19; said studs being about as high as the slit 22, they insure the turning of the rock-shaft in its bearings when the fingers are moved by the advancing sheet in the manner just indicated. Shaft 24 also carries an arm 28 in which is pivotally arranged a cup 29 having a flat top surface in which is set an elastic ring 30.

31 is a downwardly opening valve whose stem 32 projects slightly above the ring 30, being normally held against its seat by a spiral spring 32.

33 is a tube communicating with the cup 29 and connected with a vacuum pump.

When the arm 25 is lifted by the advancing sheet, as above described, the arm 28 also rises, and this brings the valve stem 32 against the lowermost sheet in the pile, the resultant depression of the valve, taken with the contact of the ring 30 with the lowermost sheet, permitting the suction which is maintained through the tube 33 to cause the arm 28 to assume a hold on the lowermost plate so that, when the arm 25 is again free to fall, the weight of the parts 25 and 28 will act to draw the portion of the sheet controlled by the arm 28 downwardly, thus slightly parting it from the other sheets. As best indicated in Fig. 9, this parting of the lowermost sheet from the others is made possible through a slight recess 34 being formed in the plates $t$ and $u$,—i. e., under the left hand end of the pile of plates. In order to permit the cup 29 to engage with the lowermost sheet, the back of the plate $u$ is formed with a rectangular opening 35, the arm 28 being arranged to extend under the plate $u$ through cavity $r$ in the extension $o$. The pivoting of cup 29 and the elastic nature of its ring 30 allow the cup to accommodate itself both to the movement of the deflected portion of the sheet out of the plane of the body of the sheet and to the curving incident to such deflection.

On the arm 28 is pivoted to move in a horizontal plane a knife or separator 36 having a projection 37 which is adapted to be engaged by a tappet 38 set in the plate $y$, which tappet, when the rack $w$ makes its return movement, engages the projection 37 of the knife and turns the same on its pivot, the acting edge of the knife entering between the lowermost plate and the pile of plates as the same are parted by the arm 28, and thus effectually separating the lowermost plate. 39 is a spiral spring acting to normally hold the separator in the position shown in Fig. 3. It should be remarked that the suction device already described merely insures the proper parting of the sheets; if the parts are adjusted accurately and the acting edge of the knife or separator is well sharpened the operation of separating the sheets may be done by the separator alone.

Before each sheet is in position to be acted upon successively by the teeth $z$, a bend 40 is formed therein so that the teeth $z$ may positively engage the sheet. Hence 41 is a lug having an overhanging projection 42 with an inclined under edge 43, said lug being arranged in the plate $y$ between the tappet 38 and the adjoining tooth $z$. The edge of the lowermost plate being held down by the separator, when the lug 41 moves forward and catches the edge of said plate under its projection 42 and causes the sheet to move forward, it compels the portion directly engaged thereby to follow its own line of movement, while the portions of the sheet at both sides of the lug follow the surface of the recess 34 which, adjacent the forward limit of movement of the lug 41, inclines upward as at 44. In short, the effect is to draw the portion of the edge of the plate immediately caught by the lug down into the slot $v$, producing the bend 40.

Meanwhile the knife 36 is assuming its normal position, since the tappet is moving forward out of contact therewith.

It will be observed that the various operations attending the separating of the lowermost sheet in the stack, and forming the bend therein so that the teeth $z$ can catch the sheet and advance it step-by-step depend upon the absence of a sheet under the fingers 26; in other words, these operations will not occur if any portion of a sheet is interposed between the fingers 26 and studs 27, because the projection 37 of the knife or separator is then above the plane of movement of the tappet 38.

45 is a detent secured to the wall 19 above the slit 22 and upon the opposite side of the slot $v$ relatively to the fingers 26. This detent coöperates with the fingers to maintain the bend in the sheet previously produced by the slit 22 during the full movement forward of the last tooth $z$; without this detent, as soon as the sheet cleared the slit, it would tend to straighten out, the sheet then rising sufficiently so that the last tooth would not carry the sheet forward the full distance assigned to it.

The forward limit of movement of the last tooth $z$ is shown in Fig. 3. From the position in which the sheet is thus left it is given another impulse by a pawl 46 which is pivoted in a slide 47 arranged in a guide 48 and connected with the rack $w$ by a pitman 49, the free end of the pawl riding lightly on the flange of one section of the lower punch member.

In Figs. 18$^a$ to 18$^e$ we have shown a somewhat more positive mechanism whereby to control the operations of the shaft 24 (which carries the sheet separating cup 29 and knife or separator 36) and of the means for ejecting the punched sheets. On the shaft 24 is arranged an arm 1$^a$, shown in Fig. 18$^a$ in transverse section, and pivoted in this arm at right angles to the axis of movement thereof, on a pivot 1$^b$, is a dog 1$^c$ having a notch 1$^d$ which, when the dog swings over to its right hand limit of movement, is adapted to be engaged by a lug 1$^e$ secured to a part of the plunger (to be described); when the latter descends with the dog at its left hand limit (Fig. 18$^a$) the dog will not be engaged by the lug. When the dog is struck by the lug, it causes arm 1$^a$ to be depressed, so that a block 1$^f$ on a crank 1$^g$, also carried by shaft 24, is moved off of an elevation 1$^h$ on the lever 1$^i$, gravity then acting on the lever to throw its upper end to the right and cause its lower end, by means of its elevation 1$^h$, to lock arm 1$^g$ (and, also, shaft 24) in the position it last assumed. (At this point it should be remarked that a spring 1$^j$ may coöperate with gravity on lever 1$^i$, although it should be observed that owing to the incline of the entire machine, as shown in Fig. 1, the use of such spring will not be necessary.) In a bracket $1^k$ is fulcrumed a crank $1^l$ connected with a crank $1^m$ on shaft 24 by the link $1^n$. $2^a$ is a lever pivoted in a depending portion $2^b$ of the table and carrying at its upper end, which is bent over the table, a finger $2^c$ which is pivoted thereto and depends therefrom into a longitudinal groove $2^d$ in a guide plate $2^e$ which may be attached to said table, the pivotal movement of said finger being limited by its having a hole $2^f$ penetrated by a pin $2^g$ of somewhat smaller diameter (Fig. $18^a$). Pivotally connected with the lever $2^a$ is a slide rod $3^a$ which is guided in the bracket $3^z$, extended over the crank $1^l$ (Fig. $18^c$) and has its free end formed with a slot $3^b$ having the left one-half portion thereof set a little higher than the right half portion thereof; this slot is penetrated by a stud $4^a$ which is carried by the rack $w$. A cam $5^a$ is arranged on the main shaft $g$ so as to engage a roller $5^b$ on lever $1^l$ and move the latter against the tension of its spring or the action of gravity at the proper time.

The operation of the mechanism shown in Figs. $18^a$ to $18^e$ is as follows: As will be hereinafter pointed out the punching mechanism stands immediately to the right of the dog $1^c$ and when the punches have imparted their last thrust to any given sheet its rear edge stands immediately between the depending portion $1^f$ of said dog and the adjoining punch. The dog is supposed to be kept in the position shown in Fig. $18^a$ by having its portion $1^f$ resting on the sheet and when the sheet moves out from under it, the action of gravity causes it to move to the right, bringing it under the lug $1^e$ which, as it descends with the plunger, strikes the dog and causes the rocking of shaft 24 which is then locked in the position to which it thus moves by the lever $1^l$. The rocking of shaft 24 effects the raising of the slide rod $3^a$; the slide rod $3^a$ and lever $2^a$ normally occupy the position shown in full lines in Fig. $18^a$, and in this position the stud $4^a$ on the rack $w$ plays back and forth in the left hand (elevated) portion of slot $3^b$. When, however, said slide rod is elevated, as above stated, which occurs when the stud $4^a$ and rack $w$ are in their extreme right hand positions, owing to the shape of the slot $3^b$ the slide rod $4^a$ will be drawn to the left on the next movement (to the left) of the stud (the previous right hand movement of the rack $w$ having brought the advancing sheet to its last position under the punch). Slide rod $3^a$ now moves to the left, pulling lever $2^a$ over with it, the finger $2^c$ falling through one of the punch holes in the sheet and into slot $2^d$ so as to catch the sheet and thrust it off the guide plate $2^e$ when lever $2^a$ next moves to the right. Meanwhile the rocking of shaft 24 through the parts controlled from lug $1^e$ has caused the cup 29 to draw down the rear edge of the lowermost sheet in the pile, as already described, while the movement of the rack $w$ to the left has brought the tappet 38 against the knife 36 so that the latter enters between the lowermost sheet and the pile of sheets. The next movement of the rack $w$ to the right, which corresponds to the first movement of the lowermost sheet in the pile, finds the stud $4^a$ moving in the right hand portion of slot $3^b$. The new sheet now moves and projects itself under dog $1^c$ so that the latter will now be moved to the left and thus out of the way to be engaged by lug $1^e$ so long as said sheet is interposed. The stud $4^a$ now moves again to the left, but meanwhile cam $5^a$ has moved the lower end of lever $1^l$ to the right so that the shaft 24, under the weight of parts $1^g$, $1^m$, $1^n$, $1^l$ and $3^a$, rocks to the left, elevating the cup 29 against the (now) lowest sheet in the pile. The consequent depression of slide rod $3^a$ causes it to be engaged by stud $4^a$ for movement to the right by the latter when stud $4^a$ reaches its extreme left hand limit, and when stud $4^a$ now moves to the right the slide rod moves with it, thereby moving lever $2^a$ which, through its finger $2^c$, throws the punched sheet out of the machine.

In order to avoid damage which might occur, through improper adjustment, should the rod $3^a$ be elevated in the extremities of slot $3^b$ instead of where they meet, the mechanism may be made yielding as follows (Fig. $18^e$): The arm $1^g$ is connected with the crank $1^l$ by a spring $1^p$, instead of by a link; $1^q$ is a spring, connecting bracket $1^k$ and arm $1^g$, for assisting the action of gravity on the parts $1^g$, $1^l$ and $3^a$. The plunger $e$ descends once for every forward and back movement of the rack $w$, and in the present adaptation three caps are punched and shaped at a time.

The upper punch member may be described as follows: To the lower end of the plunger is bolted a casting 50 having a hollow neck 51 which projects up into the plunger. Below the casting is arranged a block 52 which is guided vertically in the casting by means of bolts 53 connecting it with the casting; spiral springs 54 set in sockets in the block and the casting normally push the block downwardly. The block is penetrated by thimbles 55 which are tapped into the casting and whose lower ends are flush with the bottom surface of the block in the normal position of the parts. In each thimble is arranged a female die 56 having its lower end concave, the same being carried by the lower enlarged end 57 of a stem 58, said stem having a limited movement between the tops of the thimbles and the top of a cavity 58′ in the casting 50 and being normally held elevated by a spiral spring 59 interposed between the neck 51 and a collar 60 on the stem 58. An annular boss 61 is formed on the bottom of the block 52 around each thimble. In the frame $d$ is slidingly arranged a bent bar 62 (see Fig. 1) which penetrates the plunger, over the stem 58, and whose upward thrust, when impinged by certain parts as hereinafter stated, may be adjusted by a set-screw 63. On each up stroke of the plunger, the stem 58 brings up against said bar pushing it up till it engages set-screw 63, and, as the casting 50 and thimbles 55 continue to rise with the plunger while the stem 58 and dies 56 are held against such movement, the caps which have been punched and formed and which adhere to the upper punch member, fitting in the thimbles 55, are ejected.

The lower punch member may be described as follows: 64 is a casting having three annular bosses 65 rising therefrom, each coinciding with and having an internal diameter which is equal to that of the openings in the block 52 in which the thimbles 55 are. A male die 66, having its lower portion formed as a flange 67 resting on the table $m$ over an opening 68 therein, projects up through each boss to a point about on a level with the top thereof, it being held to the casting by screws 69. A thimble 70, surrounding each die 66, is inclosed in each boss, it being normally pressed upwardly to a position where its top is flush with the top of the boss by pins 71 extending through the flange 67 interposed between the thimble and a block 72 arranged in the opening 68, said block resting on a plate 73 which is guided on a stem 74 projecting downwardly from the table and is pressed upwardly by a spiral spring 75 interposed between said plate and a nut 76 on the stem. The thimbles are limited against movement higher than that shown in the drawings by flanges 77 and 78 on the bosses and thimbles, respectively.

When the plunger descends, the bosses 61 coact with the bosses 65 and the thimbles 55 coact with the thimbles 70 to first grip the interposed sheet between them; further movement of the plunger causes the thimbles 55 to coact with the bosses 65 to punch or cut out the disk of metal between each two thimbles 55 and 70, the yielding mounting of the thimbles 70 permitting them to give way downwardly at this time. Meanwhile the thimbles are firmly gripping the edges of the disk, drawing their marginal portions down while the body portions are held against such movement by the male dies 66. Finally the female dies bring up against the males dies and produce the usual arching or convexity in the body or central portion of each disk, the cap being now finished. On the return of the plunger the cap follows the upper punch member upwardly, on account of the upward pressure of the thimble 70, it being left disposed in the socket formed by each male die and the thimble 55, from whence it is ejected, as above described, when the stem 58 brings up against the bar 61.

In the type of punching mechanism just described, the articles punched out of the sheet have crimped flanges, the crimping being the result of flanging the material in its original form of a plain disk; that is, the operation incident to forming a flange on the disk of material when the male die forces the disk in the female die is one to which the disk will only yield when its perimeter portion takes a sinuous or crimped form. The crimping thus produced, being more or less subject to varying conditions, such as irregularities in formation in the tin, is not always perfect in form. Partly with a view to secure regularity in the crimping of the disk (i. e., the flange of the finished cap) and partly with a view to increase the efficiency, in general, of the members of the punch, we have devised the construction shown in Figs. $21^a$ to $21^g$. In these figures, $x^1$ designates the lower end of the plunger $e$ (Fig. $18^a$), the same having a cavity $x^2$ open at the bottom and covered by a cap $x^3$, which is bolted thereto. In the plunger is arranged to move vertically a stem $x^4$ having at its lower end the parallel flanges $x^5$, the lower one of which has the radial slots $x^6$ which receive the reduced flat portions $x^7$ of the male die members $x^8$, said members being adapted to bear at their upper ends against the upper flange $x^5$ and projecting down through holes $x^9$ in the cap $x^3$. The holes $x^9$ are tapped, and into the tapped portions thereof are screwed the thimbles $x^{10}$. On these thimbles are arranged the sleeves $x^{11}$ each having an external flange $x^{12}$ between which and the under side of cap $x^3$ a spiral spring $x^{14}$ is interposed, the spring, by being coiled rather tightly about the sleeve, acting to sustain the latter when not supported from beneath by the subjacent parts. The lower end of each male die $x^8$ is formed with the radial projections $x^{15}$, and it carries, tapped into it, a plug $x^{16}$ whose head is convex, as at $x^{17}$, so as to give the necessary convexity to the top of the cap. In the plug is arranged the ejector $x^{18}$ which is pushed downwardly by a spiral spring $x^{19}$ arranged in the male die and bearing at one end against a plug $x^{20}$ screwed in the top of the die and at the other end against a plunger $x^{21}$ taking against the head $x^{22}$ of the ejector $x^{18}$, which head limits the downward movement of the ejector.

$y^1$ and $y^2$ are parts corresponding to the casting 64 and bosses 65, already described.

$y^3$ designates the female dies, the same having radial recesses $y^4$ in their upper ends adapted to receive the projections $x^{15}$ of the male dies $x^8$; the part $y^3$ projects through the bosses $y^2$ and is tapped into a disk $y^5$, said disk being arranged under the plate $m$ and the parts $y^1$, $m$ and $y^5$ being held together by cap-screws $y^6$; it is essential that the projections and recesses of the parts $x^8$ and $y^3$ constantly coincide, so in order to keep the parts $y^3$ from turning each is engaged by the threaded portion of a key $y^7$ carrying a nut $y^8$ which may be set against the under side of the disk $y^5$ to effect such a frictional contact between the threading of the parts $y^3$ and $y^7$ as will bind the former against rotation.

$y^9$ is a stem supported from table $m$ and penetrating disk $y^5$. A nut $y^{10}$ thereon supports a collar $y^{11}$ in turn supporting a spiral spring $y^{12}$ forming a cushion for a disk $y^{13}$; this disk supports the ejectors $y^{14}$, which penetrate the parts $y^3$ and comprise within themselves the parts $y^{15}$, $y^{16}$, $y^{17}$, $y^{18}$ and $y^{19}$ all substantially the same as the corresponding parts $x^{18}$, $x^{19}$, $x^{20}$, $x^{21}$ and $x^{22}$, respectively, excepting that they are inverted; the purpose of the parts $y^{15}$ to $y^{19}$ is to loosen the formed caps from the recess $y^{20}$ which is formed in the top of each ejector stem $y^{14}$ to correspond with the convex face $x^{17}$ of the part $x^{16}$.

$z^1$ is a spring located in the cavity $x^2$ and acting as a cushion between the flange $x^5$ on part $x^4$ and the top of cavity $x^2$; it will be understood that a spring similar to spring 59 supports the stem $x^4$ in substantially the position in which it appears in Fig. 21$^a$.

When the plunger descends, the first operation of the punch is to grip the sheet between the parts $y^2$ and $x^{12}$, the latter yielding upwardly so that the thimbles $x^{10}$, which are positively connected with the plunger, coöperate with the parts $y^2$ to first cut out the disks. The disks thus cut out are then forced downwardly by the male die members $x^8$, into the female die members $y^3$, the plugs $x^{16}$ coöperating with the recesses $y^{20}$ in the ejector stems $y^{14}$ to make the tops of the caps dished and the projections and recesses $x^{15}$ and $y^4$ coöperating to impart the crimping in the flanges of the parts; the parts $x^8$ are of course cushioned by the spring $z^1$, while the spring $y^{12}$ cushions the parts $x^{14}$, allowing them, however, to yield somewhat to the pressure of the parts $x^8$. When the plunger ascends, the parts $y^{14}$ follow the parts $x^8$ upwardly to force the finished caps out of the cavity formed by the parts $y^3$ and $y^{14}$, while the stems $x^{18}$ and $y^{15}$ prevent the caps from adhering to the parts $x^8$ and $y^{14}$ after they cease to compress the caps between them. The finished caps then fall backward into a suitable receptacle owing to the incline of the entire machine as shown in Fig. 1.

As shown in Figs. 18$^a$ and 18$^b$, the guide plate 2$^e$ is provided with the walls 2$^h$ for preventing forward and backward movement of the sheets while passing through the punching operation; adjacent the punch these walls may carry flanges 21 to prevent the tail-end of the sheet from rising under the weight of its unsupported front end during the final operation of the punch on the sheet.

One salient feature of our invention is the means for insuring against more than one sheet being advanced from the stack of sheets at a time; it is contemplated that, if not prevented, foreign substances on the sheets, or even their frictional contact with each other, might be sufficient to cause two sheets or more to be advanced although the advancing means positively engaged only the lowermost one of them. Referring to Figs. 3, 5, 8 and 9$^a$, it will be seen that a means, the curved slit 22, is opposed to the lowermost sheet or sheets in the stack at their front ends, which means, since it tends to alter the normal form of the sheets upon their engagement therewith, of course, offers resistance to their advance. This resistance is calculated not to be overcome except by some such positive means operating on the sheet as the advancing means which positively engages the lowermost sheet; if, therefore, two sheets adhere to each other, owing to the resistance which grows out of the sheets being required to change their form on engaging the slit 22, the upper sheet will be caused to break away from the lower sheet which, being positively advanced by the advancing means, overcomes such resistance and passes through the slit leaving the upper sheet behind.

We reserve for a separate application a method involving the foregoing operation and claim herein merely the mechanism whereby said method is carried out.

Having thus fully described my invention, what I claim and desire to secure by Letters Patent is:

1. The combination, with means for holding a stack of sheets, of means for advancing each sheet relatively to the remainder of the sheets, and means, controlled by a previously separated sheet, for separating the sheets successively from the stack of sheets, substantially as described.

2. The combination, with means for holding a stack of sheets and mechanism adapted to operate on each sheet, of means for advancing each sheet to said mechanism, and means, controlled by a previously separated sheet, for separating the sheets successively from the stack of sheets, substantially as described.

3. The combination, with means for holding a stack of sheets and mechanism adapted to operate on each sheet, of means for advancing each sheet to said mechanism, and means, controlled by a previously separated sheet, for separating the sheets successively from the stack of sheets, said means normally occupying a predetermined position relatively to the stack of sheets but being movable out of the same, substantially as described.

4. The combination, with means for holding a stack of sheets and mechanism adapted to operate on each sheet, of means for advancing each sheet to said mechanism, and means, controlled by a previously separated sheet, for separating the sheets successively from the stack of sheets, said means normally occupying a predetermined position relatively to the stack of sheets but being movable out of the same by said mechanism, substantially as described.

5. The combination, with means for holding a stack of sheets and mechanism adapted to operate on each sheet, of means, adapted to be actuated by said mechanism, for separating the sheets successively from the stack of sheets, substantially as described.

6. The combination, with means for holding a stack of sheets and mechanism adapted to operate on each sheet, of means for advancing each sheet to said mechanism, and means, adapted to be actuated by said mechanism, for separating the sheets successively from the stack of sheets, substantially as described.

7. The combination, with means for holding a stack of sheets and mechanism adapted to operate on each sheet, of means for advancing each sheet to said mechanism, and means, controlled by a previously separated sheet and adapted to be actuated by said mechanism, for separating the sheets successively from the stack of sheets, substantially as described.

8. The combination, with means for holding a stack of sheets, of means for advancing each sheet relatively to the remainder of the sheets, said last-named means being controlled from a sheet being advanced from the stack of sheets, substantially as described.

9. The combination, with means for holding a stack of sheets, of means for advancing each sheet relatively to the remainder of the sheets, and means for effecting the separation of each sheet prior to its advance from the remainder of the sheets, a part of said last-named means comprising a part actuative from the advancing means, substantially as described.

10. The combination, with means for holding a stack of sheets and mechanism adapted to operate on each sheet, of means for advancing the sheets to said mechanism successively, said last-named means being controlled from a sheet which has begun its advance from the stack of sheets, substantially as described.

11. The combination, with means for holding a stack of sheets and mechanism adapted to operate on each sheet, of means for advancing the sheets to said mechanism successively, said last-named means being adapted to be actuated by said mechanism and being controlled from a sheet which has begun its advance from the stack of sheets, substantially as described.

12. The combination, with means for holding a stack of sheets and mechanism adapted to operate on each sheet, of means for advancing each sheet to said mechanism, and means, comprising a separator and a movable part carrying said separator and normally adapted to stand in a predetermined position relatively to the stack of sheets, for separating said sheets successively from the stack of sheets, said part being movable out of said position, substantially as described.

13. The combination, with means for holding a stack of sheets, of means for advancing each sheet relatively to the remainder of the sheets, and means, comprising a separator and an actuator therefor, for separating the sheets successively at the stack of sheets, the operative coöperation of said actuator and separator being controlled from the advancing sheet, substantially as described.

14. The combination, with means for holding a stack of sheets and mechanism adapted to operate on each sheet, of means for advancing each sheet to said mechanism, and means, comprising a separator and an actuator therefor, for separating the sheets successively from the stack of sheets, the operative coöperation of said actuator and separator being controlled from the advancing sheet, substantially as described.

15. The combination, with means for holding a stack of sheets and mechanism adapted to operate on each sheet, of means for advancing each sheet to said mechanism, and means, comprising a separator and an actuator therefor, for separating the sheets successively from the stack of sheets, said separator standing normally in inoperative position relatively to the actuator, but being movable into operative position relatively thereto under actuation from said mechanism, substantially as described.

16. The combination, with means for holding a stack of sheets, and mechanism adapted to operate on each sheet, of means for advancing each sheet toward said mechanism, and means, comprising a separator, an actuator therefor having a definite path of movement and a part carrying said separator and movable to bring the same within the path of movement of the actuator, for separating the sheets successively from the stack of sheets, said part being controlled from the advancing sheet, substantially as described.

17. The combination, with means for holding a stack of sheets, said means being arranged to oppose the main portion, but leave unopposed an edge portion, of an outermost sheet, of means for advancing the outermost sheet relatively to the remainder of the sheets, and means for drawing the unopposed portion of the outermost sheet into the control of the advancing means, substantially as described.

18. The combination, with means for holding a stack of sheets, said means being arranged to oppose the main portion, but leave unopposed an edge portion, of an outermost sheet, of mechanism adapted to operate on the sheets, means for advancing said sheets toward said mechanism, and means for drawing the unopposed portion of said outermost sheet into the control of the advancing means, substantially as described.

19. The combination, with means for holding a stack of sheets, said means being arranged to leave an edge portion of an outermost sheet unopposed thereby, of mechanism for effecting the removal of the sheets successively from the stack of sheets comprising means for forming a relatively outward bend in the unopposed portion of the outermost sheet, substantially as described.

20. The combination, with means for holding a stack of sheets, said means being arranged to leave an edge portion of an outermost sheet unopposed thereby, of mechanism adapted to operate on the sheets, means for advancing each sheet toward said mechanism, and means for forming a relatively outward bend in the unopposed portion of said outermost sheet, substantially as described.

21. The combination, with means for holding a stack of sheets, of means, arranged in proximity to the exposed face of one end sheet in the stack, for advancing the end sheet relatively to the remaining sheets, and means for effecting the displacement of a portion of said end sheet into the path of movement of the advancing means, substantially as described.

22. The combination, with means for holding a stack of sheets, and mechanism adapted to operate on each sheet, of means, arranged in proximity to the exposed face of one end sheet in the stack, for advancing each sheet toward said mechanism, and means for bending a portion of the end sheet adjacent said advancing means into the path of movement thereof, substantially as described.

23. The combination, with means for holding a stack of sheets, of means for effecting the advance of the sheets successively from the stack, said means being controlled from a sheet which has begun its advance from the stack, substantially as described.

24. The combination, with means for holding a stack of sheets, of means for advancing the sheets successively from the stack of sheets, and means for disposing a portion of one end sheet in the stack within the operative control of the advancing means, said means being controlled from a sheet which has begun its advance from the stack, substantially as described.

25. The combination, with means for holding a stack of sheets, of means for advancing the sheets successively from the stack, and means for bending a portion of one end sheet in the stack within the operative control of the advancing means, said means being controlled from a sheet which has begun its advance from the stack, substantially as described.

26. The combination, with means for holding a stack of sheets and mechanism adapted to operate on each sheet, of means, arranged in proximity to the exposed face of one end sheet in the stack, for advancing each sheet toward said mechanism, and means comprising a separator and an actuator therefor, for bending a portion of the end sheet adjacent said advancing means into the path of movement thereof, substantially as described.

27. The combination, with means for holding a stack of sheets and mechanism adapted to operate on each sheet, of means for advancing each sheet to said mechanism, a rocking member adapted to be controlled from the advancing sheet, a separator carried by said member, and an actuator for the separator, substantially as described.

28. The combination, with means for holding a stack of sheets, of means for advancing the sheets successively from the stack, a rocking member, a separator for the sheets carried by said rocking member, an actuator for the separator, means for effecting the movement of the rocking member, and means, controlled from a sheet which has begun its advance, for placing the rocking member within the control of the means for effecting the movement thereof, substantially as described.

29. The combination, with means for holding a stack of sheets and mechanism adapted to operate on each sheet, of a sheet-advancing member arranged to reciprocate under the stack of sheets, a separator, a movable member carrying said separator, and an actuator for the separator carried by said sheet-advancing member, said movable member being controlled as to its position relatively to the actuator by the advancing sheet, substantially as described.

30. The combination of a supporting surface and a movable sheet bending part disposed in juxtaposition thereto, the line of movement of said part and said surface being arranged obliquely to each other, substantially as described.

31. The combination of a slotted supporting surface and a movable sheet bending part disposed in said slot, the line of movement of said part and said surface being arranged obliquely to each other, substantially as described.

32. The combination, with means for holding a stack of sheets, said means being arranged to oppose the main portion but leave unopposed an edge portion, of an outermost sheet, of means, arranged in proximity to the exposed portion of the face of the outermost sheet in the stack, for advancing each sheet, and means, comprising a suction device adapted to impinge against said exposed face of said end sheet, for parting the end sheet from the stack, substantially as described.

33. In combination, with means for holding a plurality of sheets in superposed disposition, means, adapted to engage the sheets successively, for effecting a planiform movement thereof, and means acting to effect a bend in each sheet during the advance thereof, substantially as described.

34. In combination, with means for holding a plurality of sheets in superposed disposition, means, adapted to engage the sheets successively, for effecting a planiform movement thereof, and a wall disposed in the path of advance of the sheets and having a sinuate opening therethrough for the passage of the sheet being advanced, substantially as described.

35. In combination, with means for holding a plurality of sheets in superposed disposition, means, adapted to engage the sheets successively, for effecting a planiform movement thereof, and a wall disposed in the path of movement of the sheets and having a sinuate beveled opening therethrough for the passage of the sheet being advanced, substantially as described.

36. In combination, with means for holding a plurality of sheets in superposed disposition, the same having a convex face on its bottom surface, means, adapted to engage the sheets successively, for effecting a planiform movement thereof, and a wall arranged over said convex surface and having an opening in its lower portion substantially conforming therewith and forming therewith a sinuate slit, said wall and the convexity of said surface being transverse of the path of advance of the sheets, substantially as described.

37. The combination, with means for holding a stack of sheets, of means for successively separating said sheets, said means being controlled from a previously separated sheet, substantially as described.

38. The combination, with means for holding a stack of sheets, said means being arranged to leave a portion of an outermost sheet unopposed thereby, of mechanism adapted to operate on said sheets successively, said mechanism comprising means for forming a relatively outward bend in the unopposed portion of the outermost sheet, substantially as described.

39. The combination of a suitable support, a plunger movable up and down, and die members carried by the plunger and said support, respectively, one of said die members comprising an annular fixed part and a yielding part inclosed in said fixed part and adapted to be displaced therein by a part of the other die member, and said other die member comprising a yielding part arranged in abutting relation to said annular part, substantially as described.

40. The combination of a suitable support, a plunger movable up and down, and die members carried by the plunger and said support, respectively, one of said die members comprising an annular fixed part and a yielding part inclosed in said fixed part and adapted to be displaced therein by a part of the other die member, said last-named part and said annular part having radial coinciding projections and recesses, substantially as described.

41. The combination of a suitable support, a plunger movable up and down, die members carried by the plunger and said support, respectively, one of said die members comprising an annular fixed part and a yielding part inclosed in said fixed part and adapted to be displaced therein by a part of the other die member, said last-named part and said annular part having radial coinciding projections and recesses, and means for securing the parts having said projections and recesses against relative rotation, substantially as described.

42. In an ejecting mechanism, the combination of a reciprocating part, a member to be actuated therefrom, a part connecting the reciprocating part and said member and having a slot receiving the reciprocating part, said slot having portions thereof unalined but connected with each other, and means for moving said slotted part transversely of its slot, substantially as described.

43. The combination of a sheet advancing part, a member to be actuated therefrom, a part connecting the sheet-advancing part and said member and having a slot receiving said sheet-advancing part, said slot having portions thereof unalined but connected with each other, and means, controlled from the advancing sheet, for effecting the movement of said slotted part transversely of its slot, substantially as described.

44. The combination of means for advancing the sheets and means, controlled from the advancing sheets, for effecting the ejection of the sheets, substantially as described.

45. The combination, with means for holding a stack of sheets, said means being arranged to oppose an outermost sheet in the stack while leaving an end portion of said sheet unopposed thereby, of a pivoted suction device adapted to impinge against said unopposed portion of the sheet to move the same away from the adjoining sheet, substantially as described.

46. The combination, with means for holding a stack of sheets, said means being arranged to oppose an outermost sheet in the stack while leaving an end portion of said sheet unopposed thereby, of a pivoted suction device adapted to impinge against said unopposed portion of the sheet to move the same away from the adjoining sheet, said device having its sheet impinging portion elastic, substantially as described.

In testimony, that we claim the foregoing, we have hereunto set our hands this 2nd day of July, 1907.

BENJAMIN ADRIANCE.
AMOS CALLESON.

Witnesses:
JOHN W. STEWARD,
WM. D. BELL.